May 6, 1930.  F. STREICH ET AL  1,757,818
MIXING MACHINE
Filed May 27, 1929   3 Sheets-Sheet 1

Inventors
Frank Streich
Ward P. Elwood,
by Charles O. Sherer
Their Atty

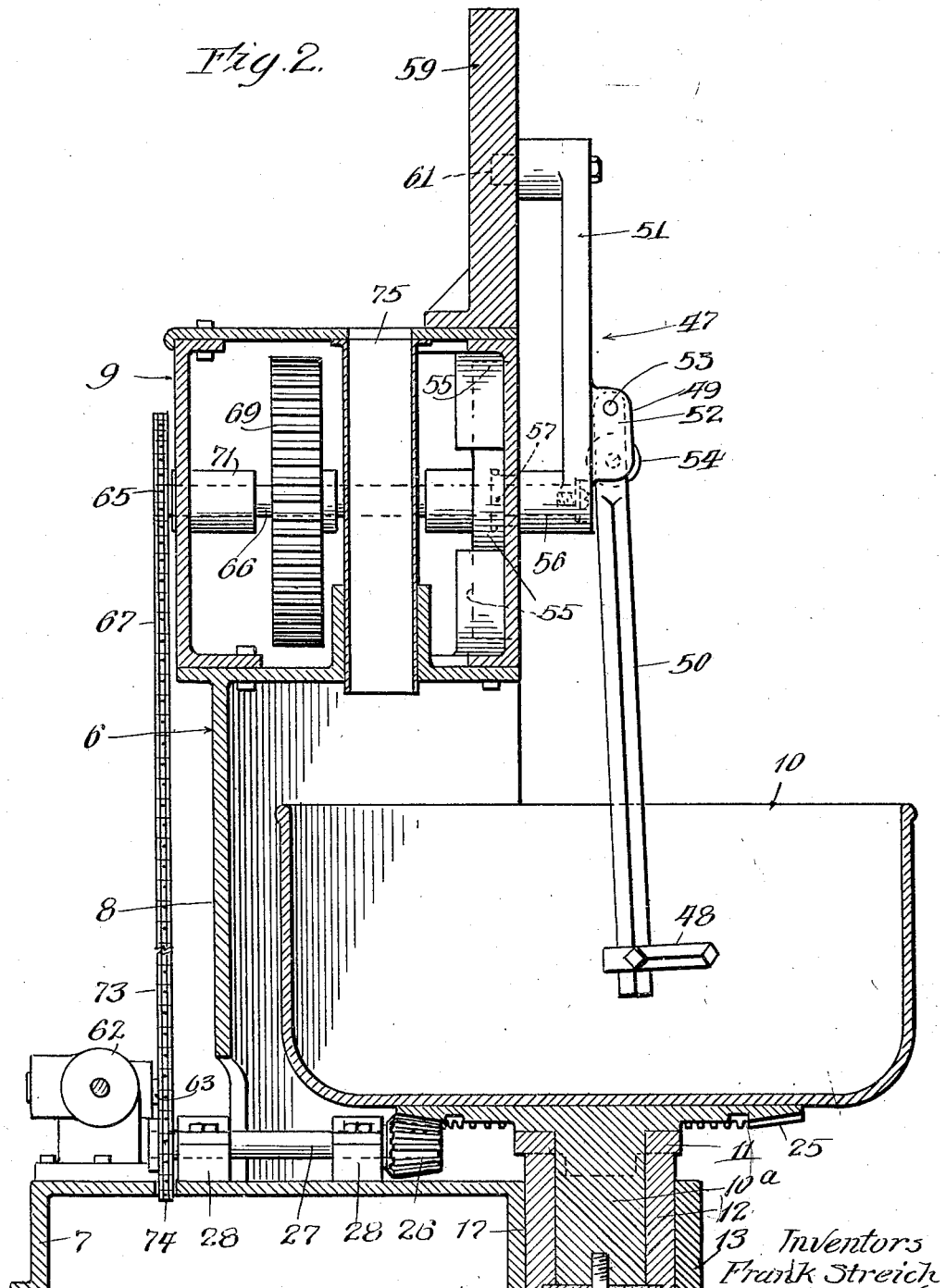

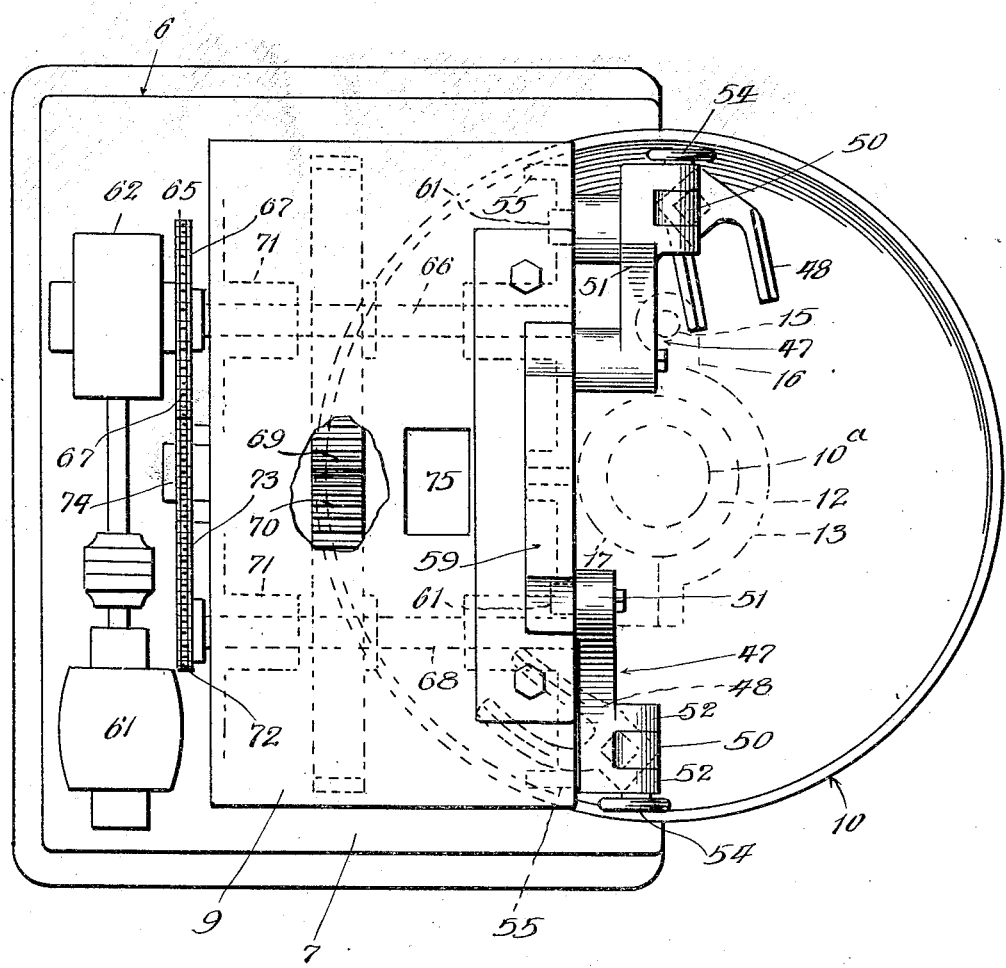

Patented May 6, 1930

1,757,818

UNITED STATES PATENT OFFICE

FRANK STREICH AND WARD P. ELWOOD, OF JOLIET, ILLINOIS, ASSIGNORS TO UNION MACHINERY COMPANY, OF JOLIET, ILLINOIS, A CORPORATION OF ILLINOIS

MIXING MACHINE

Original application filed March 14, 1929, Serial No. 346,843. Divided and this application filed May 27, 1929. Serial No. 366,186.

This invention relates to mixing machines of that type which employs a rotatable mixing bowl in conjunction with a pair of mixing arms which are moved through the mass in opposite directions through parallel vertical planes in predetermined orbits or paths of movement.

The subject matter of this application has been divided out of our pending application Serial No. 346,843, filed March 14, 1929, for improvements in mixing machines.

The principal object of the present invention is to provide a novel mixing arm construction. Another object is to provide a mixing arm construction having means for controlling the movement of each mixing arm through a predetermined orbit. Another object is to provide a pair of unconnected mixing arms actuated by crank wheels or disks and having fulcrums guided to move in curved paths whereby the effective ends of the mixing arms may be caused to move through predetermined orbits.

With these and other objects and advantages in view, this invention consists in a mixing machine having a pair of unconnected mixing arms. It further consists in a mixing machine in which the unconnected mixing arms are guided and actuated independently of each other. It further consists in a mixing machine having novel means for governing the movement of each mixing arm through a predetermined orbit.

It further consists in the several novel features of construction, arrangement and combination of parts hereinafter fully set forth and claimed.

The invention is clearly illustrated in the drawings accompanying this specification in which—

Fig. 2 is a vertical cross section taken on the line 2—2 of Fig. 1; and

Fig. 3 is a plan of the machine, partly broken out.

Figure 1:
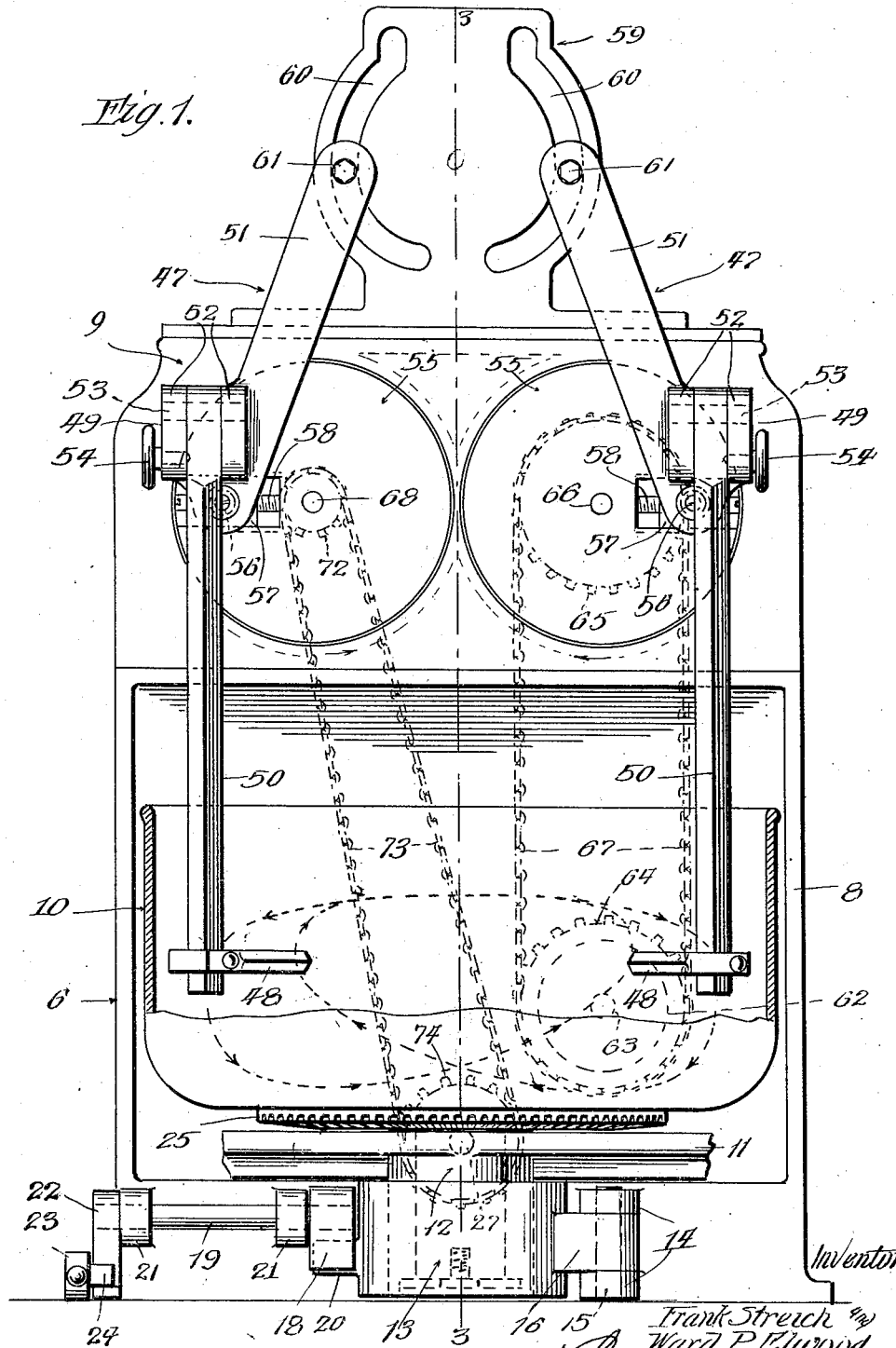
Figure 1 is a front elevation, partly broken out, of a mixing machine embodying one form of the present invention.

Referring to said drawings, the reference character 6 designates a frame of solid and substantial construction upon which the operative parts of the machine are mounted. The frame is formed with a widened base portion 7 and with a recessed standard 8 rising therefrom. Upon the standard is mounted a gear case 9 in which are contained certain gears as will appear hereinafter.

The mixing bowl is seen at 10, and said bowl is rotatably mounted upon a vertical axis, and like the construction shown and described in the pending application above referred to, the bowl may be rotatably mounted in a saddle 11 which extends transversely across the front of the machine and has a downwardly projecting hub member 12 in which is journaled a stud shaft or trunnion 10ª that is secured to and projects down from the bottom of the bowl.

At the front of the base 7 means are provided for holding the hub of the saddle in upright position during the mixing operation, and, as shown, said means comprise a clamping member 13 hingedly secured to forwardly projecting ears by an upright pin 15 which extends through an ear 16 formed on the clamping member. The forward end of the base is formed with a semi-cylindrical socket 17 and the clamping member 13 is formed with a companion semi-cylindrical portion which completes a cylindrical socket in which the hub 12 is removably held. The clamping member 13 may be secured in place by means similar to that shown in the pending application above referred to. If desired, bowl tilting means may be provided as in the machine shown and described in our said pending application.

Upon the bottom of the mixing bowl is secured a beveled ring gear 25 which is adapted to mesh with a beveled pinion 26 mounted upon the end of a shaft 27 journaled in bearings 28 carried by the base, and said shaft 27 is rotated by driving means as will be hereinafter explained. During the mixing operation, the shaft 27 is rotated, and, consequently, the mixing bowl is rotated upon its vertical axis.

Associated with the mixing bowl are two mixing arms 47 which are moved in opposite directions through two vertical planes while the mixing bowl is being rotated, said mixing arms having upon their lower ends mixing fingers or paddles 48 which are adjustable lengthwise of the arms. Each of the mixing arms is jointed between its ends, as at 49, to enable the lower part 50 of each arm to be swung upwardly and out of the bowl when the latter is to be tilted. The upper part 51 of each arm is formed with a pair of ears 52 and at its lower end between which the lower part 50 of the arm is held and pivoted thereto by a pin 53. A set screw, or other clamping device 54 is provided in one of the ears 52 for rigidly holding the lower part 50 of the arm in its operative position.

Two crank wheels 55 rotatably mounted in the gear case 9 are provided for oscillating the mixing arms 47, and said crank wheels have wrist pins 56 projecting therefrom which engage in apertures contained in the upper part 51 of each mixing arm. In order to vary the sweep of the mixing arms, the wrist pins are adjustable radially of the crank wheels, and, as shown, are mounted in slide blocks 57 slidably mounted in the crank wheels and having adjustment screws 58 whereby each slide block may be adjusted towards or away from the axis of rotation of the crank wheel in which it is mounted.

Supported upon the gear case 9 is a cam block 59 in which are formed two oppositely disposed cam grooves 60 in which travel pins or rollers 61 carried by the upper ends of the mixing arms 47. The cam grooves 60 are shaped so as to control the movement of the upper ends of the mixing arms, whereby their lower ends may take predetermined orbits or paths through the mixing bowl. To obtain the most efficient results, particularly with certain kinds of materials to be mixed, it is desirable to have the mixing fingers travel downward along lines approximately parallel with and close to the side wall of the mixing bowl, and thereafter to follow the curve between the side wall and bottom of the bowl and thence substantially parallel with the bottom of the bowl past the center thereof and then upward and back along curved lines towards the side of the bowl. Such an orbit is indicated by the dotted lines in Fig. 1. In order to cause the mixing fingers to travel along such paths, the cam grooves 60 are shaped to extend along curvilinear lines from top to bottom, the end portions of which approach each other.

By varying the radius of the wrist pins, and by varying the shape of the cam grooves 60, other orbits or paths of movement may be imparted to the mixing fingers 48, and by advancing the wrist pin in one crank wheel beyond the other, various relative movements may be had between the mixing fingers. This is made possible because the upper ends of the mixing arms are movable independently of each other. However, by obtaining the path of movement described, the mixing fingers are capable of acting on all or practically all of the materials contained in the mixing bowl during the mixing operation, since the rotating bowl carries the mass around with it while the mixing fingers are being thrust through the same. Inasmuch as the mixing fingers move in opposite directions, they pass through and lift up the mass, thereby thoroughly stirring it and mixing it together.

The drive mechanism for the mixing arms and mixing bowl will now be described. Mounted upon the base 7 is an electric motor 61 which furnishes the power for driving the mechanism, and said motor is connected to a speed reducing gear mechanism 62 also mounted upon the base 7. The shaft 63 of the speed reducing gear mechanism has a sprocket wheel 64 thereon which is connected to a sprocket wheel 65 on the shaft 66 of one of the crank wheels 55 by a sprocket chain 67. The shaft 66 and shaft 68 of the other crank wheel 55 are geared together by gear wheels 69 and 70 that may run in oil contained in the hollow of the gear case. The shafts 66 and 68 are journaled in bearings 71 carried by the walls of the gear case 9. On the shaft 68 is a sprocket wheel 72 which is connected to a sprocket wheel 74 on the shaft 27 by a sprocket chain 73. The gearing just described forms a very simple one for transmitting power from the driving motor 61 to the mixing bowl and mixing arms.

Extending through the gear case 9 is a chute 75 through which the ingredients to be mixed may be delivered to the mixing bowl from a point located above the machine. The discharge end of the chute is located above the mixing bowl when the latter occupies the position assumed when clamped to the frame by the clamping member 13.

In the operation of the mixer, the materials to be mixed are deposited in the mixing bowl when the saddle is clamped in place on the frame of the machine. When the motor is started, the bowl is rotated upon its axis and the mixing arms moved in opposite directions through the orbits or paths heretofore described. The mass contained in the mixing bowl is consequently carried around with the bowl and as the mixing fingers pass through the mass they cut through it and lift it from the bottom, thereby thoroughly mixing it. When the operation has been completed, the motor is stopped. The set screws 54 are then turned back to loosen the lower parts of the mixing arms whereby they may be swung upwardly out of the bowl.

It is to be understood that whereever the word "unconnected" appears in association with the mixing arms in the specification and claims, it means that the upper ends of the mixing arms are separate from each other and their fulcrums are movable relative to each other, whereby each arm may be given a different movement from that of the other arm.

In its present form, the mixer has been shown and described for use in mixing dough, and it is highly efficient for this purpose. The machine, however, may be used for mixing other ingredients, as is readily apparent.

More or less variation of the exact details of construction is possible without departing from the spirit of this invention. We desire, therefore not to limit ourselves to the exact form of the construction shown and described, but intend, in the following claims, to point out all of the invention disclosed herein.

We claim as new, and desire to secure by Letters Patent:

1. In a mixing machine, the combination of a supporting frame, a mixing bowl carried thereby, a pair of oppositely disposed unconnected mixing arms adapted to extend into said bowl, arm actuating crank members journaled in said frame, and a cam block having non-circular curvilinear cam grooves for individually guiding the upper ends of said arms to move in irregularly curved paths, the end portions of which approach each other whereby to control the movement of the lower ends of the arms.

2. In a mixing machine, the combination of a supporting frame, a mixing bowl carried thereby, a pair of oppositely disposed unconnected mixing arms having mixing fingers upon their lower ends, a pair of crank wheels, radially adjustable wrist pins connecting said arms with said crank wheels, whereby the length of travel of the mixing arms is regulated and guide means for the upper end of said mixing arms.

3. In a mixing machine, the combination of a supporting frame, a mixing bowl carried thereby, a pair of oppositely disposed unconnected mixing arms provided with mixing fingers upon their lower ends adapted to operate in said bowl, said arms being jointed between their ends whereby the lower parts thereof may be swung out of the mixing bowl, means for securing the lower parts of said mixing arms in operative position relative to the upper parts thereof, means carried by said frame for imparting motion to said mixing arms, and means for controlling movement of said arms, including cam engaging members on said arms, and a stationary guide member having cam grooves therein which extend in non-circular curvilinear lines toward each other.

4. In a mixing machine, the combination of a supporting frame, a mixing bowl rotatably carried thereupon, a pair of oppositely disposed unconnected mixing arms having jointed portions adapted to extend into said mixing bowl and capable of being swung out of the same, means for holding said jointed portions of the mixing arms in fixed relation, crank wheels operatively connected to said mixing arms, and a cam block having cam grooves therein which extend in non-circular curvilinear lines toward each other and co-operate with said mixing arms to control movement of the lower ends thereof.

5. In a mixing machine, the combination of a supporting frame, a mixing bowl rotatably carried thereby, a pair of unconnected mixing arms having mixing fingers thereon movable transversely within said mixing bowl in two vertical parallel planes, and means for imparting motion to said mixing arms, including engaging members on said arms, and a cam block having cam grooves therein extending in non-circular curvilinear lines.

6. In a mixing machine, the combination of a supporting frame, a mixing bowl rotatably carried thereby, a pair of unconnected mixing arms having mixing fingers thereon movable transversely within said mixing bowl in two vertical parallel planes, means for imparting motion to said mixing arms, including crank wheels operatively connected to said mixing arms, and a cam block mounted on the frame and having cam grooves which extend in non-circular curvilinear lines and co-operate with the upper ends of the mixing arms to direct the movements of the lower ends thereof.

7. In a mixing machine, the combination with a crank wheel and a cam block, of a mixing arm comprising two jointed sections and means for securing said sections in fixed relation to each other, a mixing finger mounted for longitudinal adjustment on one of said sections, and connections on the other section arranged to operatively engage with said crank wheel and cam block.

8. In a mixing machine, the combination of a supporting frame, a mixing bowl carried thereby, a pair of oppositely disposed mixing arms adapted to extend into said bowl, each arm having a separately movable fulcrum member, a guide member having cam grooves extending in non-circular curvilinear lines for said fulcrum members, and rotating members connected to said mixing arms intermediate their ends.

9. In a mixing machine, the combination of a supporting frame, a mixing bowl carried thereby, a pair of oppositely disposed unconnected mixing arms adapted to extend into said bowl, arm actuating crank wheels journaled in said frame, and a cam block having oppositely disposed cam grooves which extend in non-circular curvilinear lines, the ends of which approach each other, said cam groove co-operating with the upper ends of said mixing arms to control the path of movement taken by their lower ends.

10. In a mixing machine, the combination of a supporting frame, a mixing bowl carried thereby, a pair of oppositely disposed unconnected and jointed mixing arms having mixing fingers upon their lower ends, non-circular guiding means for guiding the upper ends of said arms to move in non-circular curvilinear paths, and means connected with said arms for moving the latter and therewith the mixing fingers across the interior of the bowl from one side to the other through paths controlled by said guiding means.

FRANK STREICH.
WARD P. ELWOOD.